UNITED STATES PATENT OFFICE.

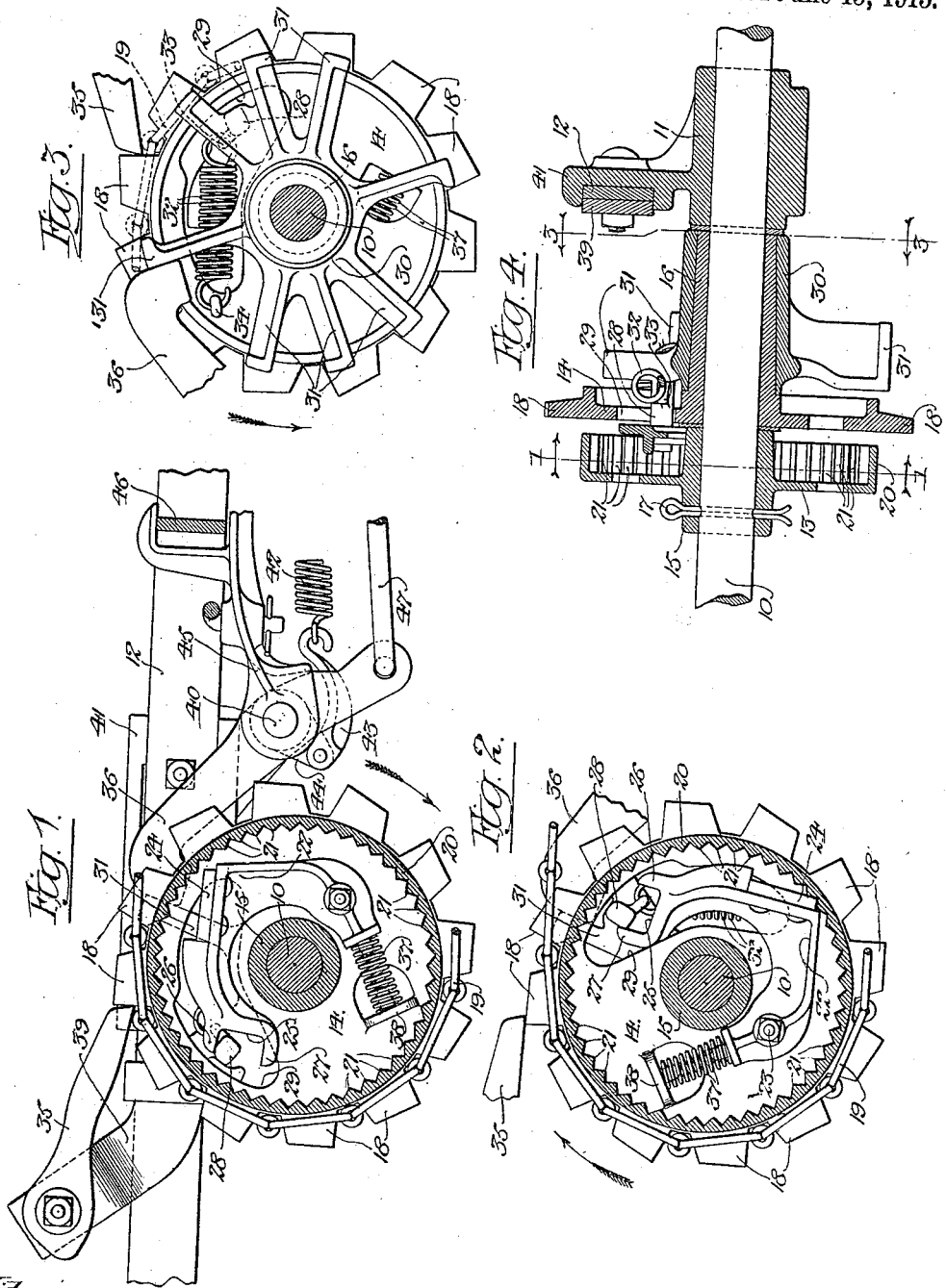

CLEMENT W. MICHAEL, OF RACINE, WISCONSIN, ASSIGNOR TO J. I. CASE PLOW WORKS, OF RACINE, WISCONSIN, A CORPORATION.

CLUTCH MECHANISM.

1,143,221.　　　　Specification of Letters Patent.　　Patented June 15, 1915.

Original application filed September 13, 1911, Serial No. 649,118. Divided and this application filed October 5, 1912. Serial No. 724,156.

*To all whom it may concern:*

Be it known that I, CLEMENT W. MICHAEL, a citizen of the United States, and a resident of Racine, county of Racine, and State of Wisconsin, have invented certain new and useful Improvements in Clutch Mechanism, of which the following is a specification.

The invention relates to clutch mechanism such as is employed for effecting the intermittent operation of the seed plates of a corn planter and seeks to provide means whereby the complete disengagement of the clutch members is properly effected.

The present application is a division of Letters Patent No. 1,052,740, granted to me February 11, 1914.

The invention consists in the features of improvement hereinafter set forth, illustrated in the preferred form in the accompanying drawings and more particularly pointed out in the appended claims.

In the drawings, Figure 1 is a view partly in elevation and partly in section on the line 1—1 of Fig. 4 of the improved clutch. Fig. 2 is a similar view illustrating the parts in changed position. Fig. 3 is an elevation of the opposite side of the clutch mechanism with parts in section on the line 3—3 of Fig. 4. Fig. 4 is a central section.

As set forth in the prior application referred to, the improved clutch mechanism is preferably mounted upon the wheel axle 10 which constitutes the main drive shaft of the machine. This axle or shaft is journaled in bearings secured to the side bars of the machine. One of these bearings 11 is shown in the accompanying drawings connected to an adjacent side bar 12. The clutch comprises rotary driving and driven members which, in the preferred embodiment of the invention illustrated, are in the form of a clutch disk 13 and a sprocket wheel 14. These clutch members are provided with sleeve-like hubs 15 and 16 through which the axle or drive shaft 10 extends. The driving or "tight" member or disk 13 is fixed to the shaft as, for example, by means of a cotter pin 17. The driven or "loose" clutch member 14, in the form shown, is provided with a series of sprocket teeth 18 over which passes a chain 19 that drives the seed plates of the planter. Other means may be employed for connecting the "loose" or driven clutch member to the seed plates.

The driving clutch member or disk 13 is provided with a laterally projecting flange 20 having a series of ratchet teeth 21 formed upon its inner face. These teeth are arranged to be engaged by a clutch dog 22 which is eccentrically pivoted upon the face of the driven clutch member 14 by a bolt 23. The particular form of clutch dog illustrated is L-shaped and is provided at its corner with a wear plate 24 which engages the teeth 21 of the clutch disk 13. One end of the clutch dog is provided with a notch or recess 25 between two lugs or shoulders 26 and 27 thereon. A stud 28 projects laterally through an opening 29 in the driven clutch member 14 and into the recess 25. This stud is fixed to a rotatable clutch controlling member, the sleeve-like hub 30 of which is mounted on the hub 16 of the driven clutch member 14. This clutch controlling member has a number of sets of radially projecting stop arms 31 which, as clearly set forth in the prior application referred to, are arranged in different sets with a different number of uniformly spaced arms in each set; but the particular arrangement of these arms forms no part of the present invention.

A coiled spring 32 extends between lugs 33 and 34 formed, respectively, upon the clutch controlling member and on the sprocket wheel or driven clutch member 14. The driven clutch member 14 is held against backward movement by a retaining pawl 35 which engages the teeth 18 thereof, and the spring 32 tends to rotate the clutch controlling member in forward direction and thereby, through the medium of the lug 28, move the clutch dog 22 into engagement with the teeth 21 of the driving clutch member 13. The driven clutch member is normally held stationary, with the clutch dog 22 disengaged and the spring 32 under tension, by a trip arm 36 which is arranged to engage one of the stop arms 31 of the clutch controlling member. A spring 37 (see Figs. 1 and 2) extends between a lug 38 on the driven clutch member and the pivoted end of the clutch dog and tends to move the latter away from the ratchet teeth 21, so that the clutch dog is held in its disengaged position by the spring 37 with the lug 26 on the free end of the dog held against the laterally projecting stud 28 of the clutch controlling member.

When the trip 36 is shifted and disengaged from one of the stop arms, the spring 32 oscillates the clutch controlling member in forward direction (indicated by the arrow in Fig. 3) and the stud 28 thereon acts against the lug 26 on the clutch dog and shifts the latter into engagement with the driving clutch disk 13. The driven clutch member 14 and sprocket chain 19 are then operated to advance the seed plates of the machine until the trip arm 36 engages another stop arm. The movement of the clutch controlling member is then arrested, but the forward movement of the driven clutch member and parts connected thereto is continued until the lost motion between the stud 28 and the lug 27 on the clutch dog is taken up. This position of the parts is shown in Fig. 2. The continued forward movement of the clutch members then forces the dog out of engagement with the ratchet teeth 21 and, as soon as this disengagement is completed, the spring 37 acts to further shift the clutch dog away from the ratchet teeth to its completely disengaged position, shown in Fig. 1. This movement of the dog is arrested by the engagement of the lug 26 thereon with the stud 28. The spring 32 is stronger than the spring 37, so that when the trip 36 is shifted to release the clutch controlling member, the dog 22 will be forced to its engaged position against the tension of the spring 37. Moreover, the axis of the spring 37, in the disengaged position of the dog shown in Fig. 1, extends slightly on one side of the pivot 23 of the dog, so that the leverage exerted by this spring is less than that exerted by the spring 32. In the engaged position of the dog, the axis of the spring 37, in the form shown, extends through the pivot of the dog, so that it exerts little or no effect thereon. Furthermore, the forward thrust of the driving clutch member upon the dog securely holds it in engaged position against any tension exerted thereon by the spring 37, but as soon as the trip engages one of the stop arms to initially disengage the dog through the medium of the clutch controlling member, the spring 37 further shifts the latter away from the teeth of the driving ratchet 13 and thus prevents a chattering of the dog upon the ratchet teeth or the accidental engagement of the clutch members.

Upon the complete disengagement of the clutch members, the retaining pawl 35 engages one of the teeth 18 of the driven clutch member or sprocket wheel and holds the latter against backward movement. In the form shown, this retaining pawl engages the teeth of the sprocket wheel outside of the chain 19 and, for this reason, the teeth 18 which engage the chain are extended and provided with properly shaped outer ends which, in effect, form ratchet teeth with which the retaining pawl 35 coöperates. This pawl is mounted upon an upwardly and inwardly projecting bar 39 which is secured to the adjacent side bar 12. By means of this pawl the loose driven clutch member is normally held against backward movement and at the same time it is held against forward movement by the engagement of the trip arm 36 with one of the stop arms 31.

The trip arm 36 is pivotally mounted upon a stud 40 which projects inwardly from a bracket 41 secured to the adjacent side bar 12. This bracket also sustains the bearing 11 of the shaft 10. A spring 42 is connected by a link 43 to an arm 44 on the hub of the stop arm 36 and serves to hold the latter normally in position with its rear end engaging one of the stop arms 31 and with its opposite end held in engagement with a bracket 45. This bracket, as clearly set forth in the prior application referred to, is slidably mounted upon a cross bar 46 and is provided with perforated ears at its rear end which engage the spindle or pivot 40 on opposite sides of the trip arm so that the bracket and trip arm can be shifted laterally to thereby bring the trip into coöperative relation with any one of the sets of stop arms 31. As this arrangement of the trip arm forms no part of the present invention, it need not be more fully set forth. The trip arm is connected by a link 47 to the checkrow mechanism and is shifted at each operation of the machine to effect the operation of the clutch and seed plates driven therefrom.

The stud 28 arranged between the lugs 26 and 27 on the end of the clutch dog form a lost motion connection between the dog and the clutch controlling member, so that the spring 37 can act, as described, to throw the dog well away from the ratchet teeth 21 and thereby prevent the chattering of the dog over the teeth or the accidental engagement of the dog therewith.

It is obvious that the details set forth may be varied without departure from the essentials of the invention as defined in the claims.

I claim as my invention:

1. In a clutch mechanism, the combination with rotary driving and driven clutch members, of a clutch dog for connecting said members, a spring for throwing said dog into engaged position, a trip for initially disengaging said dog, and a second but weaker spring connected to said dog for further shifting the same from engaged position, substantially as described.

2. In a clutch mechanism, the combination with rotary driving and driven clutch members, of a clutch dog for connecting said members, a rotary clutch controlling member for shifting said dog, a spring for throwing said dog to engaged position, a trip coöperating with said controlling clutch member for initially disengaging said dog, and a second but weaker spring for further shifting said dog to its disengaged position, substantially as described.

3. In a clutch mechanism, the combination with rotary driving and driven clutch members, of a dog mounted on said driven clutch member and shiftable into and out of engagement with said driving member, a rotary clutch controlling member having a lost motion connection with said dog, a spring connecting said controlling member and said driven clutch member for throwing said dog into engaged position, a trip coöperating with said controlling clutch member to initially disengage said dog and a second but weaker spring for further shifting said dog to its disengaged position, substantially as described.

4. In a clutch mechanism, the combination with rotary driving and driven clutch members, of a dog for connecting said clutch members, a clutch controlling member operatively connected to said dog and having a series of stop arms, a trip for engaging said stop arms to initially shift said dog from engaged position, and a spring for completing the shift of said dog to its disengaged position, substantially as described.

5. In a clutch mechanism, the combination with rotary driving and driven clutch members, of a spring for throwing said clutch members into engagement, a trip for initially disengaging said clutch members, a second but weaker spring for completing the disengagement of said clutch members, and a retaining pawl for preventing the backward movement of said driven clutch member, substantially as described.

6. In a clutch mechanism, the combination with rotary driving and driven clutch members, of a clutch dog mounted on said driven clutch member and shiftable into and out of engagement with said driving member, a rotary clutch controlling member coaxial with said driving and driven members and having a lost motion connection with said dog, a spring connecting said controlling member and said driven clutch member for throwing said dog into engaged position, said clutch controlling member having a series of stop arms, a trip arranged to engage said stop arms to initially disengage said dog, and a second but weaker spring interposed between said driven clutch member and said dog for further shifting the latter to its disengaged position, substantially as described.

7. In a clutch mechanism, the combination with rotary driving and driven clutch members, of a dog mounted on said driven clutch member and shiftable into and out of engagement with said driving member, a rotary clutch controlling member operatively connected to said dog, a spring connecting said controlling member and said driven clutch member for throwing said dog into engaged position, a trip coöperating with said clutch controlling member for initially disengaging said dog, a second but weaker spring interposed between said dog and said driven clutch member for completing the shift of said dog to its disengaged position, and a retaining pawl arranged to engage said driven clutch member to prevent the backward movement thereof, substantially as described.

CLEMENT W. MICHAEL.

Witnesses:
STANLEY A. BREWER,
EDWARD E. WILLIAMS.

Copies of this patent may be obtained for five cents each, by addressing the "Commissioner of Patents, Washington, D. C."